Feb. 22, 1966  J. B. SLEVIN, JR  3,236,414
BOTTLE CARRIER
Filed Dec. 10, 1963  8 Sheets-Sheet 1

INVENTOR.
Julian B. Slevin, Jr.
BY
Paul & Paul
ATTORNEYS.

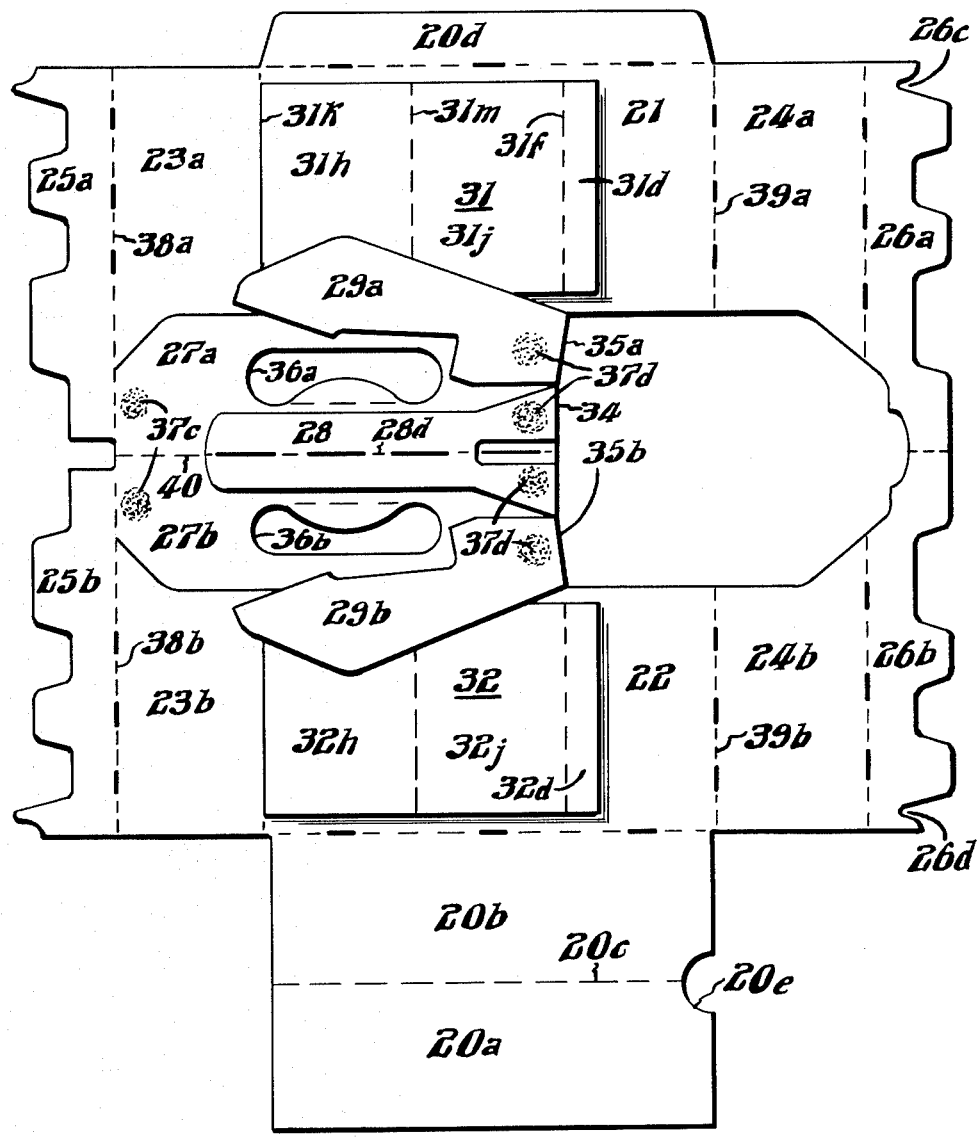

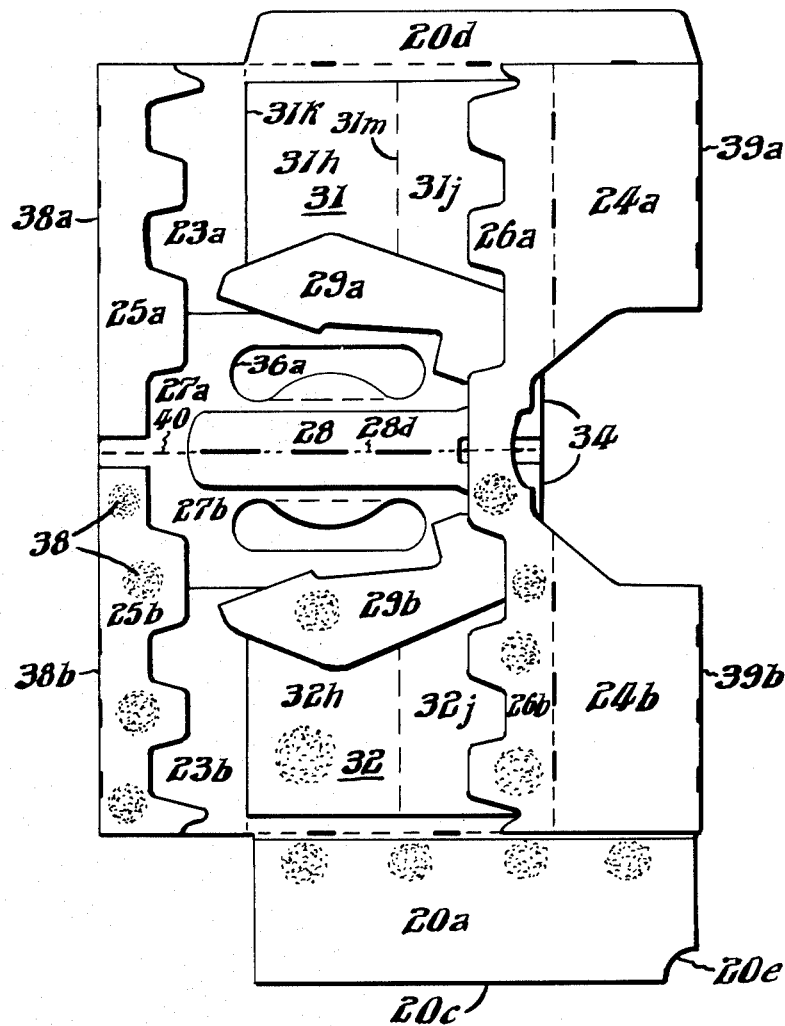

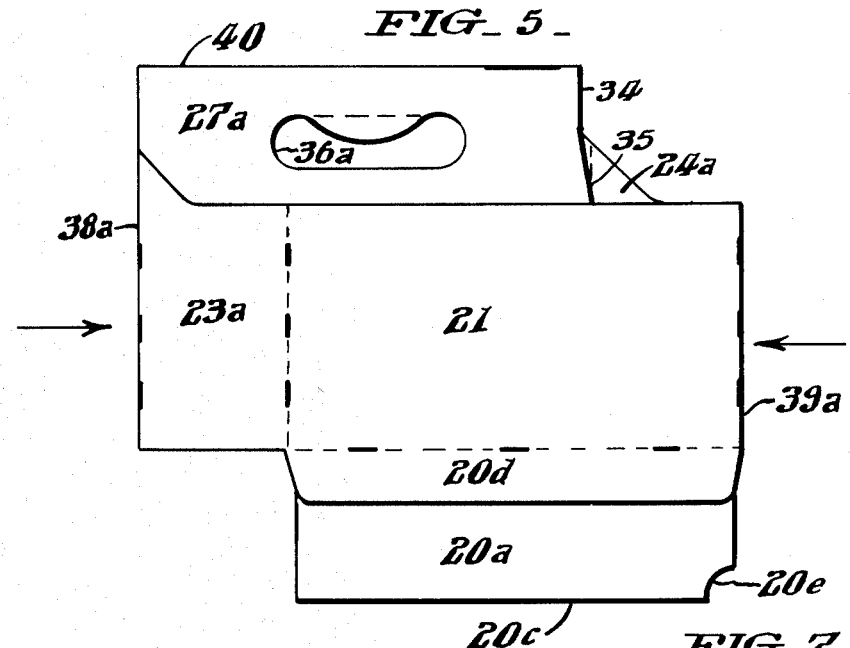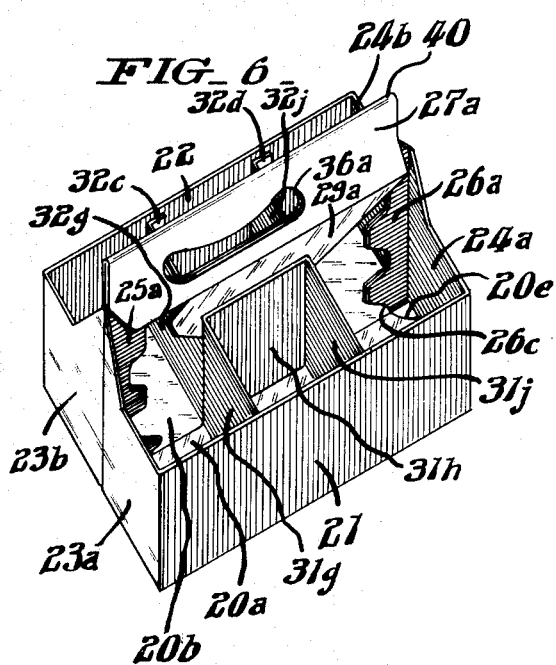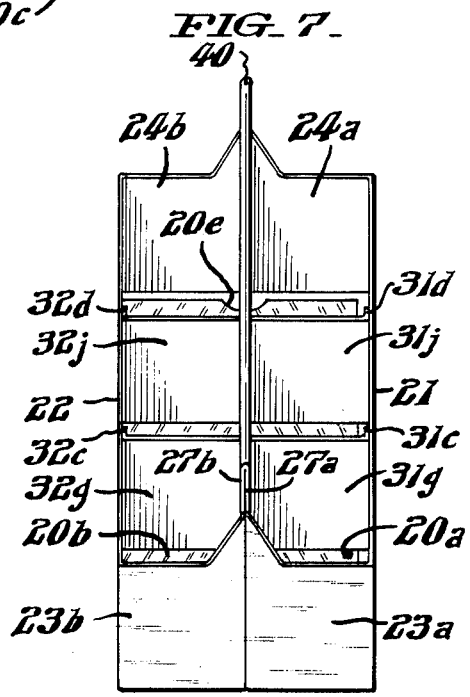

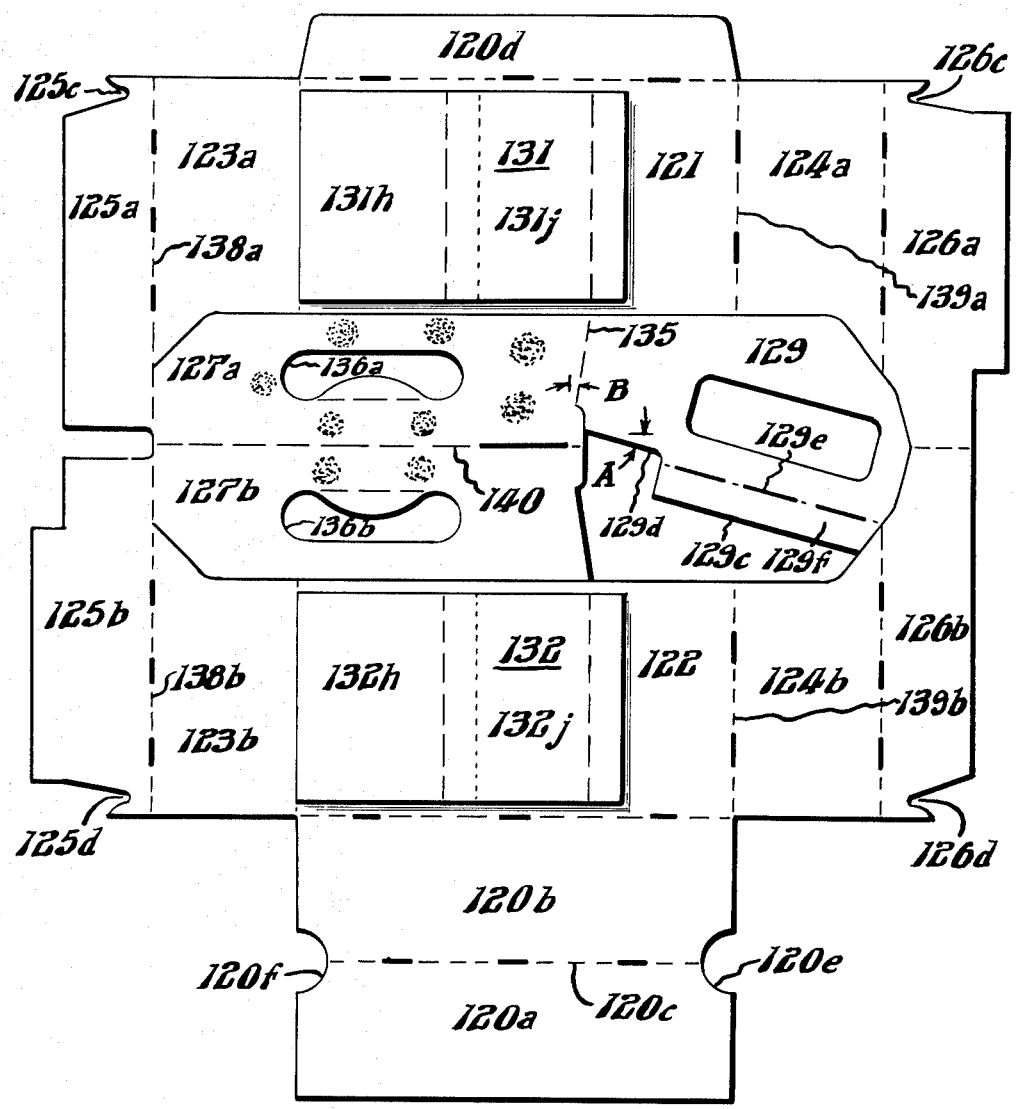

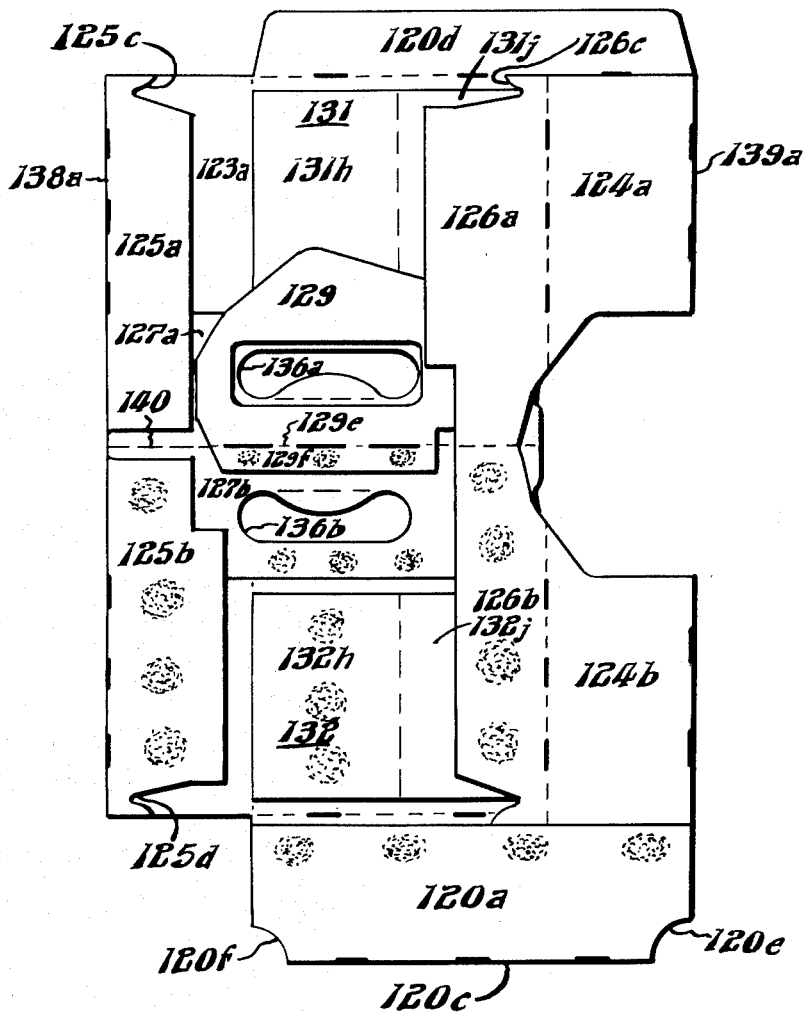

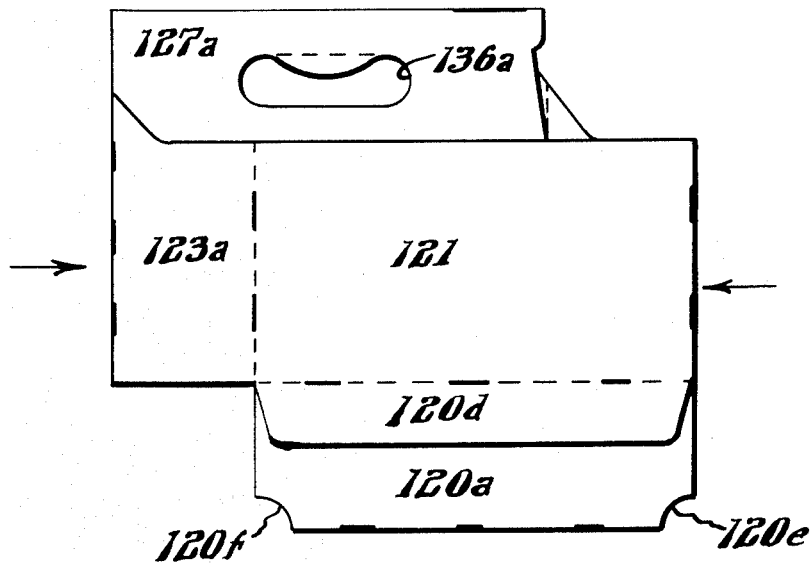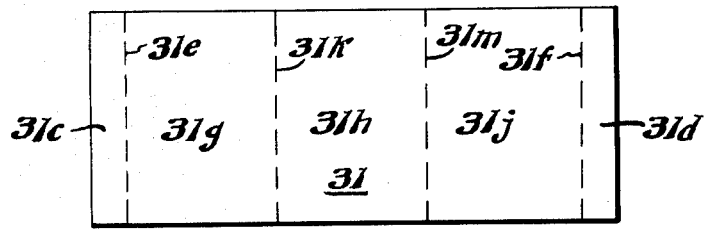

United States Patent Office 3,236,414
Patented Feb. 22, 1966

3,236,414
BOTTLE CARRIER
Julian B. Slevin, Jr., Havertown, Pa., assignor to Julian B. Slevin Company, Inc., Lansdowne, Pa., a corporation of New Jersey
Filed Dec. 10, 1963, Ser. No. 329,589
2 Claims. (Cl. 220—113)

This invention relates to carriers for bottles and similar articles, particularly carriers formed from paperboard, cardboard, or like sheet material which may be fabricated for shipment in flat collapsed form, and erected readily and easily to form a carton, having a suitable handle portion, for carrying a numbe of bottles, for example, six bottles in two rows of three each.

My present invention relates to an improvement in such carriers wherein full center cells are provided and wherein an improvement in the handle portion is attained.

My invention will become clear from a consideration of the following detailed description of several preferred embodiments selected for illustration in the drawing, wherein.

Figure 1:
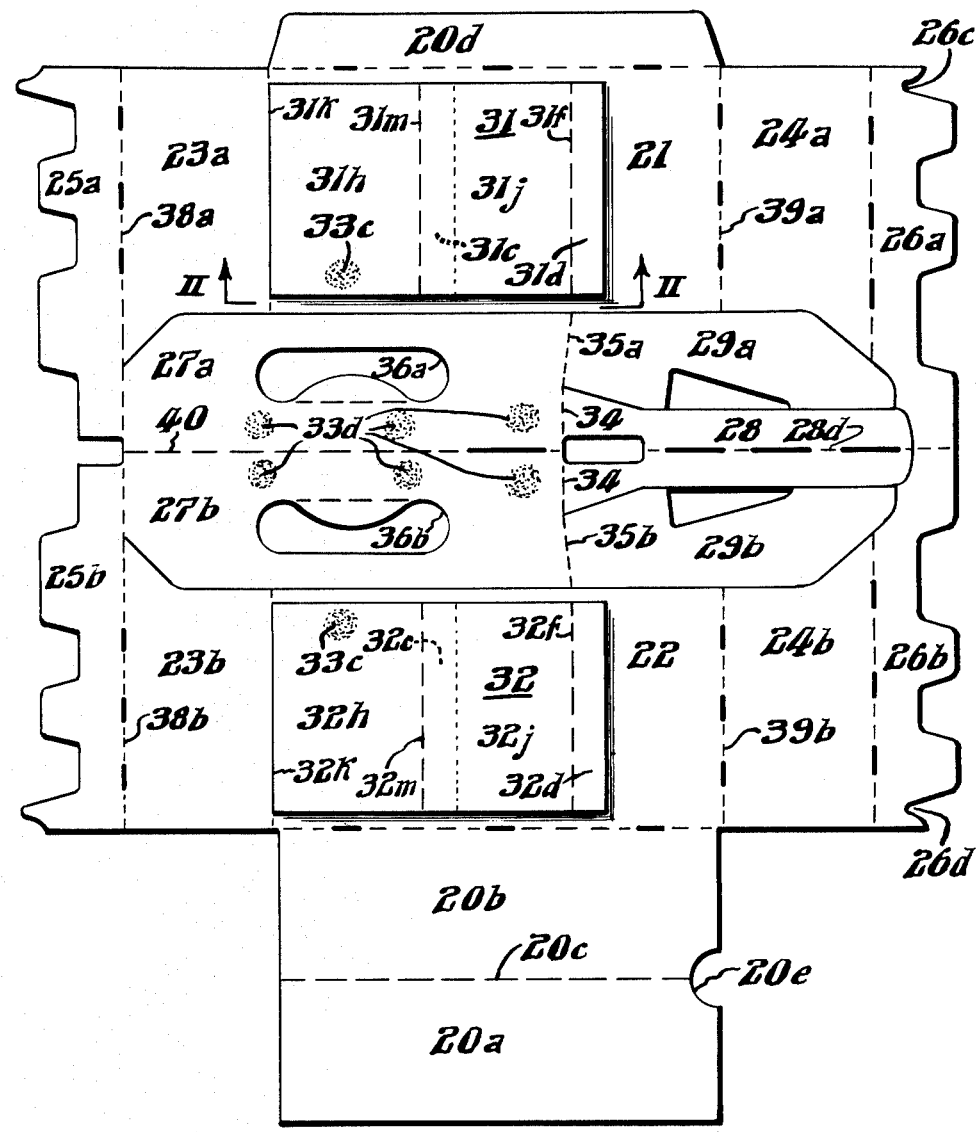
FIG. 1 is a plan view of a blank embodying my invention in one form.
Figure 9:
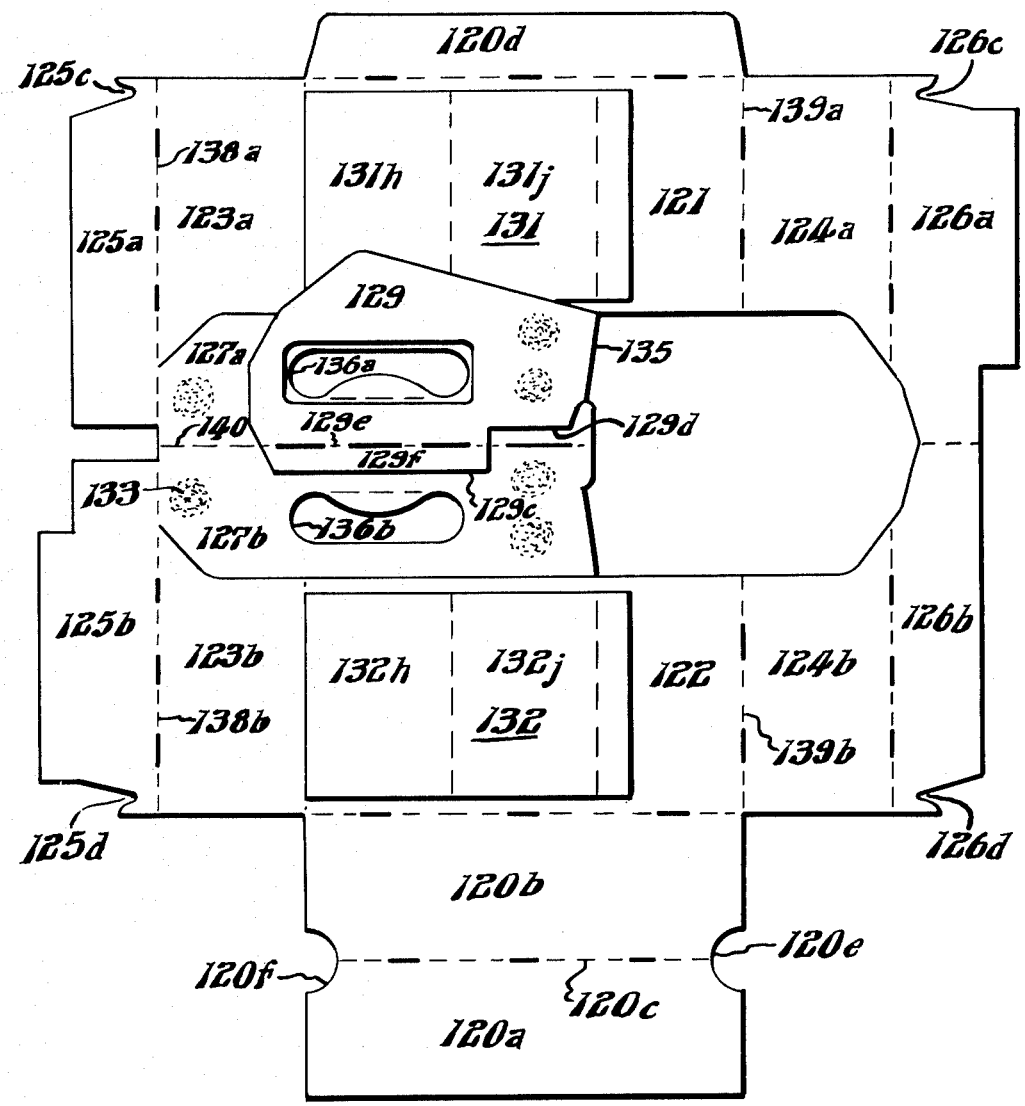

FIGS. 3, 4, and 5 are sequential plan views showing the successive gluing and folding steps performed in constructing the carrier from its initial blank form shown in FIG. 1 into its final collapsed form shown in FIG. 5;

FIG. 6 is a perspective view of the carton of FIG. 5 in erected form;

FIG. 7 is an end view of the carrier of FIG. 6, as seen from above;

FIG. 8 is a plan view of another form of blank embodying my invention;

FIGS. 9, 10, and 11 are sequential plan views showing successive gluing and folding steps performed in constructing the carrier from its initial blank form shown in FIG. 8 into its final collapsed form shown in FIG. 11; and FIG. 12 is a plan view of one of the inserts in flat unfolded condition.

In describing the preferred embodiments of the invention illustrated in the drawing, specific terminology has been resorted to for the sake of clarity. However, it is not the intention to be limited to the specific terms so selected, and it is to be understood that each specific term includes all technical equivalents which operate in a similar manner to accomplish a similar purpose.

Referring now to FIG. 1, the blank there shown is cut and scored to form areas which, when the blank is folded and erected, comprise a bottom 20a and 20b having a center fold line 20c, a bottom flap 20d, side walls 21 and 22 (which are partially obscured by inserts 31 and 32, later to be described) end walls 23a, 23b and 24a, 24b, end-wall fold-in panels 25a, 25b and 26a, 26b, handles 27a and 27b, and handle-reinforcing panels 28, 29a and 29b.

Figure 2:
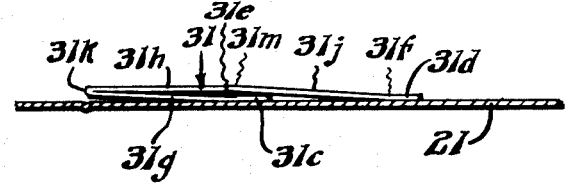
FIG. 2 is an elevational view along the line II—II of FIG. 1.

In accordance with my present invention, inserts 31 and 32 are provided and glued to the side walls 21 and 22, respectively, in a manner to be described. Each of the inserts 31 and 32 is substantially identical to the other, and it will be sufficient to describe but one of them. Insert 31 will be described. This insert, before folding, is illustrated in FIG. 12. It comprises a rectangular sheet of cardboard (or like material) having relatively narrow vertical edge portions 31c and 31d, defined by the fold lines 31e and 31f, the remainder of the insert being divided into three equal sections 31g, 31h, and 31j, by the fold lines 31k and 31m. As seen in FIG. 1, the edge portions 31c and 31d of the insert are glued to the side wall 21 at the side-wall one-third points, and the insert is folded along fold line 31k so that section 31g underlies section 31h, as best seen in FIG. 2. Thus, in FIG. 1, fold line 31e underlies and is obscured by fold line 31m, and section 31g underlies and is obscured by section 31h.

The other insert 32 is of similar shape and is similarly folded and glued to the side wall 22.

In the blank shown in FIG. 1, the opposing vertical edges of the blank are cut in a complementary manner. This conserves material, since the blank shown may be but one of a number of similar blanks cut from a larger piece.

Glue is applied at the eight spots or areas shown in FIG. 1, identified by the reference numerals 33c and 33d. After the glue spots 33c and 33d are applied, the handle-reinforcing panel 28, which has a horizontal center fold line 28d, is folded along the vertical fold line 34 and is secured by the six glue spots 33d to the handles 27a and 27b, as shown in FIG. 3. So folded, panel 28 occupies a position between the hand holes 36a and 36b. Handle-reinforcing panels 29a and 29b are then folded along the obliquely vertical fold lines 35a and 35b, respectively, and are glued, by the two glue spots 33c, to the center sections 31h and 32h of the inserts 31 and 32, respectively. Glue is then aplied to the six spots 37c and 37d located in FIG. 3.

Next, the end panels 25a, 25b are folded along the vertical fold lines 38a and 38b, respectively, and glued, by the two spots 37c to the handles 27a, 27b, as shown in FIG. 4. As a next step, the end walls 24a and 24b are folded along the vertical fold lines 39a and 39b (FIG. 3) and glued, by the four glue spots 37d, to the handle-reinforcing panels 28, 29a and 29b, as shown in FIGS. 3 and 4.

Glue is next applied to the fourteen areas 38 located as shown in FIG. 4. The blank is then folded in half along the center horizontal fold line 40 and glued together to form the final collapsed carrier, illustrated in FIG. 5. It will be seen that when the blank of FIG. 4 is folded in half, the flap 20d is glued to the undersurface of the bottom 20a, the left end-wall fold-in panels 25a and 25b are glued together in back-to-back relation, the right end-wall fold-in panels 26a and 26b are glued together in back-to-back relation, the handle-reinforcing panels 29a and 29b are glued together in back-to-back relation, and the center sections 31h and 32h of the inserts 31 and 32 are glued together in back-to-back relation.

To erect the collapsed carrier of FIG. 5, pressure is merely applied in the opposing directions indicated by the arrows. This causes the left end walls 23a, 23b (and also the right end walls 24a, 24b, which are not visible in FIG. 5) to move to the right, pivoting about their respective fold lines. As the end walls move to the right, the handle 27a, 27b, which is attached thereto, also moves to the right, carrying with it the reinforcing panels 28, 29a, 29b. Since the reinforcing panels 29a, 29b are glued to the center sections 31h, 32h of the inserts 31, 32, these center sections are also moved to the right, and the inserts open, forming the full center cells seen in FIG. 6. During the erection action just described, the bottom 20a, 20b, also spreads open, pivoting about its center fold line 20c which moves upward. The notch 20e of the bottom is then tucked into the double-ply notch formed by the notches 26c, 26d, of the end-wall fold-in panels 26a, 26b.

FIGS. 8 to 11 illustrate a different form of my present invention. While not identical, the shape and arrangement of the blank in FIGS. 8–11 is, in many respects, similar to that of the blank of FIGS. 1–7, and corresponding parts have been identified with corresponding reference numerals to which one hundred has been added. For example, end walls 123a and 123b of the blank of FIGS. 8–11 correspond to end walls 23a and 23b of the blank of FIGS. 1–7; and the end-wall panels 125a and 125b of FIGS. 8–11 correspond to the end-wall panels 25a and 25b of FIGS. 1–7, although not identical in shape. And, like the blank of FIGS. 1–7, the blank of FIGS. 8–11 includes inserts 131 and 132 corresponding to the inserts 31 and 32 of FIGS. 1–7.

The principal difference between the form of blank shown in FIGS. 8–11 and the form shown in FIGS. 1–7 is with respect to the handle-reinforcing portion. In the blank of FIGS. 8–11, there is but a single handle-reinforcing panel 129, rather than two complementary panels 29a and 29b, as in FIGS. 1–7. The single panel 129 is foldable along the obliquely vertical fold line 135. The lower edge of reinforcing panel 129, as viewed in FIG. 8, is a stepped affair in which edge 129c projects beyond edge 129d. The two edges are parallel to each other, each being inclined downwardly with respect to the horizontal at an angle A which is equal to the angle of inclination B of the obliquely vertical fold line 135 with respect to the vertical. A fold line 129e parallels the edge 129c at a spaced distance therefrom forming the portion 129f. The location of fold line 129e is such that when the reinforcing panel 129 is folded along the obliquely vertical fold line 135, the panel 129 takes up the position shown in FIG. 9 in which the fold line 129e is in overlying alignment with the center fold line 140 of the handle portions 127a and 127b. It will be seen that in this folded position, the panel 129 provides a completely encircling reinforcement for the hand hole 136a of handle 127a.

Glue marks are next applied to the six areas 133 indicated in FIG. 9, after which, as shown in FIG. 10, the end-wall panels 125a and 125b are folded on the vertical fold lines 138a and 138b, and the end walls 124a and 124b are folded along the fold lines 139a and 139b to produce the partially folded form shown in FIG. 10.

Glue is then applied to the twenty-one areas indicated in FIG. 10, and the form is then folded along the center fold line 140 to produce the final collapsed form shown in FIG. 11 in which the carton is shipped. It will be seen that, as a result of being folded along the center line 140, as just described, the left end-wall panels 125a and 125b become glued together in back-to-back relation, the right end-wall panels 126a and 126b are similarly glued in back-to-back relation, the flap 120d is glued to the undersurface of bottom 120a, the center sections 131h and 132h are glued together in back-to-back relation, the reinforcing panel 129 becomes glued to the center section 132h and also to the handle 127b, and the protruding portion 129f of the handle-reinforcing panel 129 becomes glued to a corresponding portion of panel 129 on the other side of the fold line 129e. The arrangement described is such as to produce a handle of improved strength.

To erect the collapsed carrier of FIG. 11, pressure is applied in the opposing directions indicated by the arrows. This causes the left end walls 123a, 123b (and also the right end walls 124a, 124b, which are not visible in FIG. 11), to move to the right, pivoting about their respective fold lines. As the end walls move to the right, the handle 127a, 127b, which is attached thereto, moves to the right, carrying with it the reinforcing panel 129. Since the reinforcing panel 129 is glued to the center section 131h, 132h of the inserts 131, 132, these center sections are also moved to the right, and the inserts open, forming full center cells, similar to those shown in FIG. 6. During the erection action just described, the bottom 120a, 120b also spreads open, pivoting about its center fold line 120c which moves upward. The notches 120e and 120f are then placed into the double-ply notches formed by the notches 125c, 125d and 126c, 126d of the end-wall fold-in panels.

While the preferred embodiments of this invention have been described in some detail, it will be obvious to one skilled in the art that various modifications may be made without departing from the invention as hereinafter claimed.

Having described my invention, I claim:

1. A flat blank of sheet material cut and scored and capable of being erected from flat condition to form a multi-cell bottle carrier, said blank having portions which when erected form the bottom, sidewall, end wall, and handle portions of the carrier, said bottom, sidewall, and end wall portions occupying outward positions in said flat blank, said handle portion occupying an inward position in said blank, said handle portion comprising first, second and third sub-portions only, said first and second sub-portions having correspondingly-located hand holes therethrough and being joined by a longitudinal fold line, said third sub-portion being disposed to one side of said first sub-portion and joined thereto by a diagonally vertical fold line, said third sub-portion extending diagonally downward and occupying an inward area of said blank laterally disposed from said second sub-portion and separated therefrom by an enclosed cut-out area, said third sub-portion having a hand hole therethrough so located that when said third sub-portion is folded on said diagonally vertical fold line its hand hole completely surrounds the hand hole of said first sub-portion, said third sub-portion having a fold line across the lower portion thereof which, when said third sub-portion is folded on said diagonally vertical fold line, falls into alignment with said longitudinal fold line between said first and second sub-portions.

2. A bottle carrier blank as claimed in claim 1 characterized in that each of said sidewall portions has a rectangular insert secured to said sidewall at each of the vertical ends of the insert, said insert being folded along vertical lines to form, when said blank is erected, a pair of center cells having walls secured in back-to-back relation, and further characterized in that part of said third sub-portion of said handle portion is adapted, when said third sub-portion is folded along its diagonally vertical fold line and said first and second sub-portions are folded along said longitudinal fold line, to lie between, and be secured to at least one of, the walls of said center cells which are secured in back-to-back relation.

References Cited by the Examiner
UNITED STATES PATENTS

| | | | |
|---|---|---|---|
| 2,616,611 | 11/1952 | Arneson | 229—52 |
| 2,741,399 | 4/1956 | Arneson | 220—113 |
| 2,755,960 | 7/1956 | Kramer | 220—113 |
| 2,848,136 | 8/1958 | Ringler | 220—113 |
| 3,029,977 | 4/1962 | Arneson | 220—113 |
| 3,037,662 | 6/1962 | Gish | 220—115 |
| 3,053,411 | 9/1962 | Struble et al. | 220—113 |

JOSEPH R. LECLAIR, *Primary Examiner.*

FRANKLIN T. GARRETT, J. F. McNULTY,
*Examiners.*